(12) United States Patent
Yamauchi et al.

(10) Patent No.: US 6,614,488 B1
(45) Date of Patent: Sep. 2, 2003

(54) METHOD AND APPARATUS FOR CONTROLLING TINT IN A DIGITAL COLOR DISPLAY SYSTEM

(75) Inventors: Kazushi Yamauchi, Yamato (JP); Masayuki Sohda, Zama (JP)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 09/629,266

(22) Filed: Jul. 31, 2000

(30) Foreign Application Priority Data

Aug. 23, 1999 (JP) .......................................... 11-235313

(51) Int. Cl.$^7$ .......................... H04N 9/64; H04N 9/67; H04N 9/77; H04N 5/57; H04N 5/58; G06K 9/00; G03F 3/08

(52) U.S. Cl. ..................... 348/649; 348/651; 348/671; 348/603; 348/687; 348/659; 348/661; 358/518; 358/520; 382/162; 382/167; 382/168; 382/169

(58) Field of Search ................................ 348/649, 651, 348/603, 671, 678, 687, 659–661; 345/690; 382/167, 168, 169, 162; 358/518, 520

(56) References Cited

U.S. PATENT DOCUMENTS

| 4,788,586 A | * | 11/1988 | Eckenbrecht | ............... 348/649 |
| 4,799,104 A | * | 1/1989 | Hosoye et al. | ................. 348/71 |
| 5,191,421 A | * | 3/1993 | Hwang | ....................... 348/687 |
| 5,333,243 A | * | 7/1994 | Best et al. | .................... 358/1.9 |
| 5,335,069 A | * | 8/1994 | Kim | ............................ 348/630 |
| 5,381,185 A | * | 1/1995 | Ohki et al. | .................. 348/652 |
| 5,692,071 A | * | 11/1997 | Govaert | ....................... 382/167 |
| 6,028,646 A | * | 2/2000 | Jeong et al. | ................. 348/645 |
| 6,211,922 B1 | * | 4/2001 | Jun | ............................. 348/569 |
| 6,326,977 B1 | * | 12/2001 | Westerman | .................. 345/591 |

FOREIGN PATENT DOCUMENTS

| JP | 7-99586 | 4/1995 |
| JP | 7-99587 | 4/1995 |

* cited by examiner

*Primary Examiner*—John Miller
*Assistant Examiner*—Paulos Natnael
(74) *Attorney, Agent, or Firm*—Scully, Scott, Murphy & Presser; Robert M. Trepp, Esq.

(57) ABSTRACT

A method and apparatus for controlling tint in a digital color display system capable of efficiently performing tint control of displayed colors. The tint control method is executed according to the following: (1) when the maximum and the minimum among R, G, B are the maximum gray scale value and the minimum gray scale value respectively, a step of transforming the input color into a color of a different tint based on a use defined maximum transformation value and a transformation direction; (2) when the maximum and the minimum among R, G, B are Dmax and Dmin respectively, a step of transforming the input color into a color of a different tint based on a smaller transformation value and the same transformation direction; and (3) when all values R, G, B are equal, a step of not transforming the input color in accordance with any input set value.

5 Claims, 12 Drawing Sheets

W(L, L, L)        W' (Dmax, Dmax, Dmax)
R(L, 0, 0)        R' (Dmax, 0,    0    )
G(0, L, 0)        G' (0,    Dmax, 0    )
B(0, 0, L)        B' (0,    0,    Dmax)
Y(L, L, 0)        Y' (Dmax, Dmax, 0    )
C(0, L, L)        C' (0,    Dmax, Dmax)
M(L, 0, L)        M' (Dmax, 0,    Dmax)

X (rdi, Gdi, Bdi)             R" (Dmax, Dmin, Dmin)
Dmax = max (Rdi, Gdi, Bdi)    G" (Dmin, Dmax, Dmin)
Dmin = min (Rdi, Gdi, Bdi)    B" (Dmin, Dmin, Dmax)
                              Y" (Dmax, Dmax, Dmin)
O(0, 0, 0)                    C" (Dmin, Dmax, Dmax)
                              M" (Dmax, Dmin, Dmax)

$L = 2^n - 1$ ($n \geq 1$, n:Integer)

Figure 11
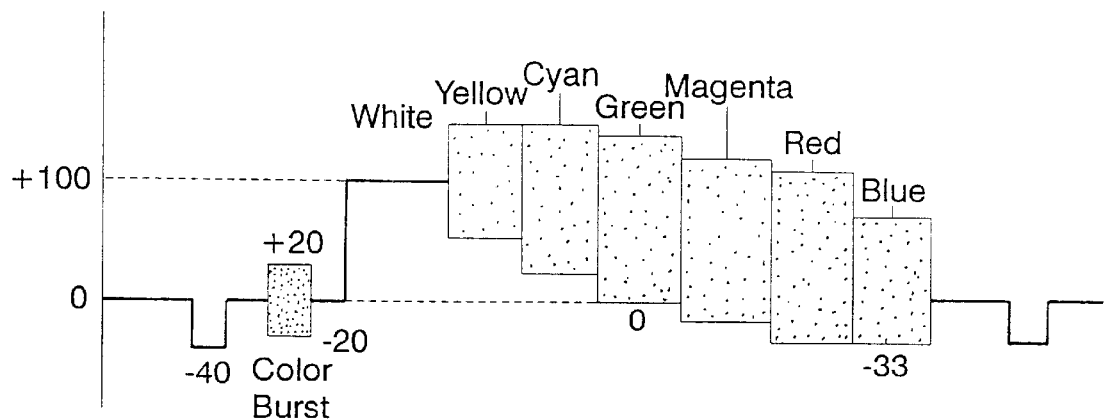
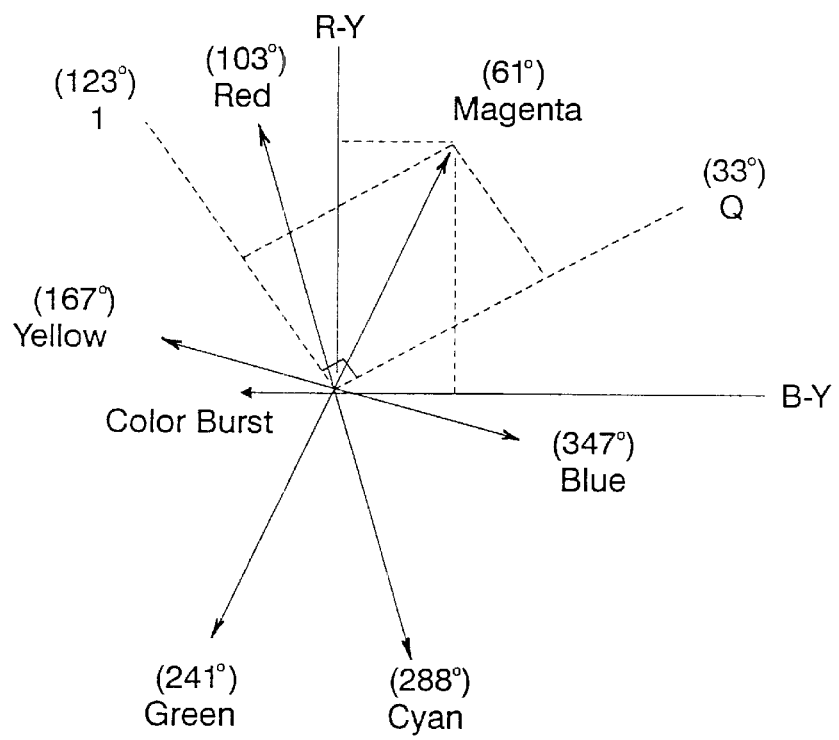
Figure 12

METHOD AND APPARATUS FOR CONTROLLING TINT IN A DIGITAL COLOR DISPLAY SYSTEM

BACKGROUND OF THE INVENTION

1. Technical Field

The present invention relates to a color controlling method in a digital color display system, particularly to a method and an apparatus for tint control of a display color in a digital color display system.

2. Prior Art

In the case of a color display system such as an LCD (Liquid Crystal Display) or CRT, it is ideal to make colors which can be expressed by the system approach natural colors as close to as possible (display color fidelity). Moreover, it is also eagerly desired that the system automatically controls or a user manually controls a color in accordance with the environment in which the system is set such as illumination so that an optimum color corresponding to each environment can be displayed (color calibration) or the same color can be outputted independently of a color display system for outputting colors (device transfer characteristics). These operations are generally referred to as color management which is an important field in which various studies and researches are performed as an item indispensable for a color display system (particularly, high-performance model) from the next generation downward. For example, white point adjustment is an item whose significance has been recognized so far and which has been actually realized in a color monitor or the like.

Color control such as control of tints between red, yellow, and green (tint control: from reddish yellow to greenish yellow) or control of color depth (from complete monochrome to deepest color), which is frequently performed for a color TV can be said to be an indispensable color control item for TV and the like though the color control is not so important as control of a white point for a color monitor of an office user. Tint control is a reminder of the period in which the fluctuation of display color characteristics was large among television receivers when a color TV first appeared. However, even at present, an audience particularly sensitive to the color of a person's face positively uses the tint control. Therefore, color TVs up to now are respectively provided with a tint control function independently of whether a display unit uses a CRT or an LCD.

Though details of the theory of the tint control for an NTSC-system color TV are left to books related to color TVs, the outline of the theory is described below. In the case of the NTSC system, three primary color signals of R, G, and B are transformed to a luminance signal Y and color signals I and Q and then transmitted. Signals. I and Q are amplitude-modulated (AM) by two color subcarriers having the same frequency and having phases shifted from each other by 90° respectively. A carrier color signal which is generated by combining the above modulated signals is multiplexed to the luminance signal Y to finally obtain a composite color signal. (so-called a video signal). It is publicly known to further frequency-modulate (FM) the composite color signal and superimpose it on a radio wave in the case of ground-wave analog broadcast. FIG. 11 shows a waveform of the composite color signal when displaying a color-bar test pattern. FIG. 12 shows the phase and amplitude of the carrier color signal of each color of the color bar test pattern in the form of vectors in the above case.

In a color TV, a composite color signal is divided into a luminance signal Y and a carrier color signal by a Y/C separation circuit. Moreover, the carrier color signal is demodulated by two reference color subcarriers having phases 90° shifted from each other generated in accordance with a color burst signal multiplexed on the composite color signal and thereby, R-Y component (value obtained by subtracting luminance Y from red component) and B-Y component (value obtained by subtracting luminance Y from blue component) are obtained. Furthermore, G-Y, component (obtained by subtracting luminance Y from green component) is generated from R-Y and B-Y by a matrix circuit and added to the luminance signal Y separated by the Y/C separation circuit respectively and thus, R, G, and B signals are obtained.

In this case, by delaying or advancing the relative phases of the reference color subcarriers to the phase of the color burst signal from the normal phase, obtained R-Y and B-Y have values different from normal values. FIG. 13(a) shows a case of slightly delaying the relative phase (−φ), which, as shown in FIG. 13(b), almost corresponds to a case of obtaining a color shown by a vector as if rotated counter-clockwise by φ in the vector space in FIG. 12 (Although there is a slight error of the signal amplitude (color purity) in case of slightly delaying the relative phases by φ, it can be ignored when φ is very small). FIG. 13(c) shows a case of slightly advancing the relative phase (+φ), which, as shown in FIG. 13(d), almost corresponds to a case of obtaining a color shown by a vector as if rotated clockwise by φ in the vector space in FIG. 12.

To shift the relative phases, a method of applying phase correction to a circuit for generating reference color subcarriers from a color burst signal in accordance with L, R, and C has been generally used so far for an analog TV. For a digital-signal-processing TV, however, a method according to the matrix operation of R-Y and B-Y signals is generally used as shown in FIG. 14.

The above-described methods cannot be applied to color monitors having a video I/F using digital or analog R, G, and B inputs but having no Y/C separation system. Among these monitors, even if they respectively use an analog video I/F, a monitor that processes video data by transforming the data to digital data is mainly used at present independently of a CRT or LCD monitor. Particularly, LCD monitors having a digital video interface using a low-voltage-differential-transfer-type digital data transmission system such as LVDS or TMDS (PanelLink) are being spread. In these monitors, every video signal is processed as digital data until the signal is inputted to the source driver (X driver) of an LCD module after it is outputted from a graphics controller. Moreover, in the case of a notebook-type PC, because a system section (including a graphics controller) and a display section (LCD module) are integrated, digital data is used until the data is inputted to the source driver of an LCD module from a graphics controller.

To perform the above tint control in this digital-type color display system, it is necessary to transform R, G, and B digital data values. For a color tone conversion system according to transform of digital color data, the official gazettes of Published Unexamined Patent Application Nos. 7-99586 and 7-99587 respectively disclose a system of-obtaining a transformed value by preparing expected transformed values to the combination of many sample input color values in the form of a table (referred to as Look Up Table: LUT) and interpolating values obtained from the loop-up table for colors other than sample input colors in accordance with the information in the table. However, it is necessary for these transform systems to have a Look Up Table in a ROM and the interpolation circuit is generally complex. As a result, the circuit requires a very large size and it is necessary to have a Look Up Table for each type of transform parameter. Moreover, because the tint control function has a strong aspect that it is preferable to have the function, it is not desirable that-many circuits are required for the function.

The present invention is made to solve the above problems and its object is to provide a method and an apparatus for controlling a tint in a digital color display system capable of efficiently performing tint control of colors displayed on the digital color display system by a simple circuit.

SUMMARY OF THE INVENTION

The present invention relates to a method and an apparatus for making it possible to control the tint of a color displayed by a display system by transforming original digital color data inputted from a host machine in accordance with several set values supplied from the outside of the system in a digital color display system. That is, the present invention relates to a method for controlling a tint in a digital color display system, wherein a digital video interface for, inputting a digital video signal outputted from a host machine is used and thereby, color transform is applied to the digital video signal inputted through the digital video interface without using a Look Up Table and moreover, three primary colors constituting the display colors are referred to as R, G, and B for convenience' sake and each color is expressed by n-bit (n: integer equal to or larger than 1) digital data. Moreover, the present invention is characterized by using a method for controlling a tint in a digital color display system, comprising the steps of:

(1) when the maximum and the minimum values among R, G, B are the maximum gray scale value (=L=$2^n$-1) and the minimum gray scale value (=0) respectively, a step of transforming the input color into a color of a different tint having the maximum value among R, G, B equal to the maximum gray scale value (=L=$2^n$-1) and the minimum value among R, G, B equal to the minimum gray scale value (=0), based on a user defined maximum transformation value (=Atm) and a transformation direction (either from (R, G, B)=(L, 0, 0) via (R, G, B)=(0, L, 0) to (R, G, B)=(0, 0, L) or (R, G, B)=(0, 0, L) via (R, G, B)=(0, L, 0) to (R, G, B)=(L, 0, 0));

(2) when the maximum and the minimum values among R, G, B are Dmax and Dmin respectively (0<Dmin<Dmax<L=$2^n$-1), a step of transforming the input color into a color of a different tint having the maximum value among R, G, B equal to Dmax and the minimum value among R, G, B equal to Dmin, based on a smaller transformation value At computed from the Atm and the transformation direction same as the case of the Atm; and (3) when all values of R, G, B are equal, a step of not transforming the input color in accordance with any input set value.

Moreover, an apparatus of the present invention for controlling a tint in a digital color display system is an apparatus for executing a tint control method in the above digital color display system, constituted so that an output value after transformed is outputted in a pipeline manner to an input value before transformed as a whole, by using the transform of a line segment to integers using the core calculation function Z=f(X, Y) constituted so that Z is outputted for inputs X and Y in a pipeline manner by hardware as the basis of transform.

Moreover, the present invention shows a transform formula and a circuit configuration for constituting a system for transforming successively-inputted digital color data synchronously with a pixel clock through a certain number of clock cycles and outputting the data in a pipeline manner by a relatively simple circuit by using a circuit block as the basis of transform, which realizes the core calculation function Z=f(X, Y), whose core is an algorithm of approximating a line segment in an orthogonal two-dimensional coordinate system with efficient calculation to points having integral coordinates.

BRIEF DESCRIPTION OF THE DRAWINGS

Preferred embodiments of the present invention will now be described by way of example only, with reference to the accompanying drawings in which:

FIG. 11 is an illustration showing the waveform of a composite color signal when displaying a color bar test pattern by the NTSC system;

FIG. 12 is an illustration showing the phase and amplitude of a carrier color signal for each color of an NTSC-system color bar test pattern in the form of vectors;

DETAILED DESCRIPTION OF THE PREFERRED EMBODIMENTS OF THE INVENTION

Figure 1:
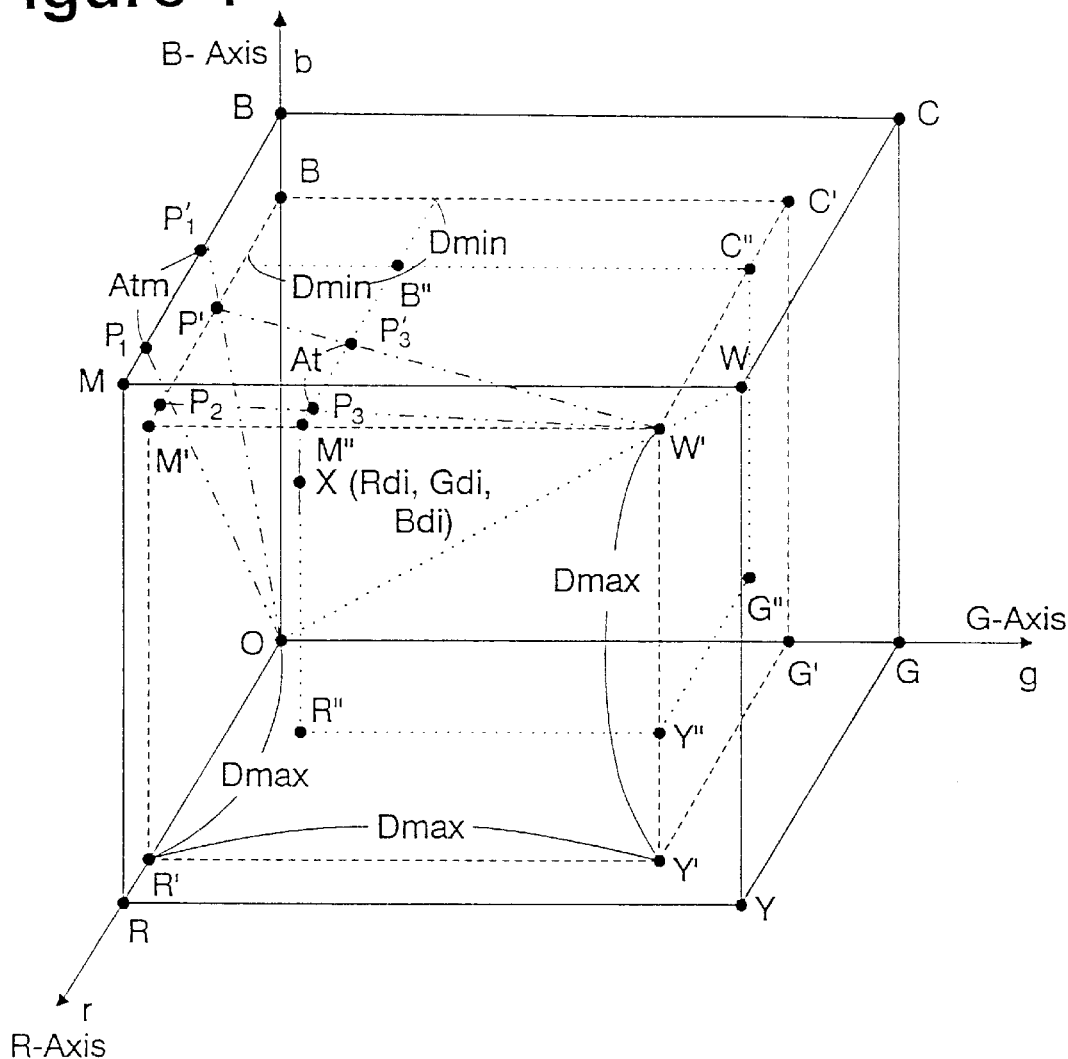
FIG. 1 is an illustration for explaining a tint control method of the present invention in an R-G-B orthogonal coordinate system.

First, a method of the present invention for controlling a tint in a digital color display system is described below. Values of Rdi, Gdi, and Bdi of a certain clock phase and values of Rdo, Gdo, and Bdo obtained by transforming the values of Rdi, Gdi, and Bdi through tint control of the present invention are expressed in accordance with the movement of integral lattice points in the R-G-B orthogonal coordinate system shown in FIG. 1. That is:

Point X (Rdi, Gdi, Bdi) ⓑ Point X' (Rdo, Gdo, Bdo)
In this case, when the following is assumed:
Dmax=max (Rdi, Gdi, Bdi)
Dmin=min (Rdi, Gdi, Bdi)
X is transformed to X' by transforming the point X to the point X' located at a position determined by moving the point X on six types of line segments shown by the following expressions clockwise or counter clockwise about the axis of O(0, 0, 0)–W(L, L, L) when viewed from the point O.

r=Dmax, g=Dmin, Dmin≦b≦Dmax
r=Dmax, Dmin≦g≦Dmax, b=Dmin
Dmin≦r≦Dmax, g=Dmax, b=Dmin
r=Dmin, g=Dmax, Dmin≦b≦Dmax
r=Dmin, Dmin≦g≦Dmax, b=Dmax
Dmin≦r≦Dmax, g=Dmin, b=Dmax That is, the point X' is obtained by moving the point x on line segments M"R", R"Y", Y"G", G"C", C"B", and B"M" in the rotational direction shown by the downward arrow in FIG. 1 in the case of clockwise rotation (viewed from the point O) and in the rotational direction shown by the upward arrow in FIG. 1 in the case of counterclockwise rotation. As long as the point X is located at any one of the above six line segments, the point X' is brought to a position obtained by moving the point X by the same distance in the same rotational direction.

Then, it is assumed that Atm ($0 \leq $ Atm $\leq L=2^n-1$) shows a distance (absolute value) to be transformed by the tint control method of the present invention when the point X is present on any one of line segments MR, RY, YG, GC, CB, and BM. In this case, if it is assumed in FIG. 1 that point $P_1$ is moved to point $P_1'$ through the transform by the tint control method of the present invention (moving distance Atm), point $P_2$ is moved to point $P_2'$ (moving distance At') and point $P_3$ is moved to point $P_3'$ (moving distance At).

Figure 2A:
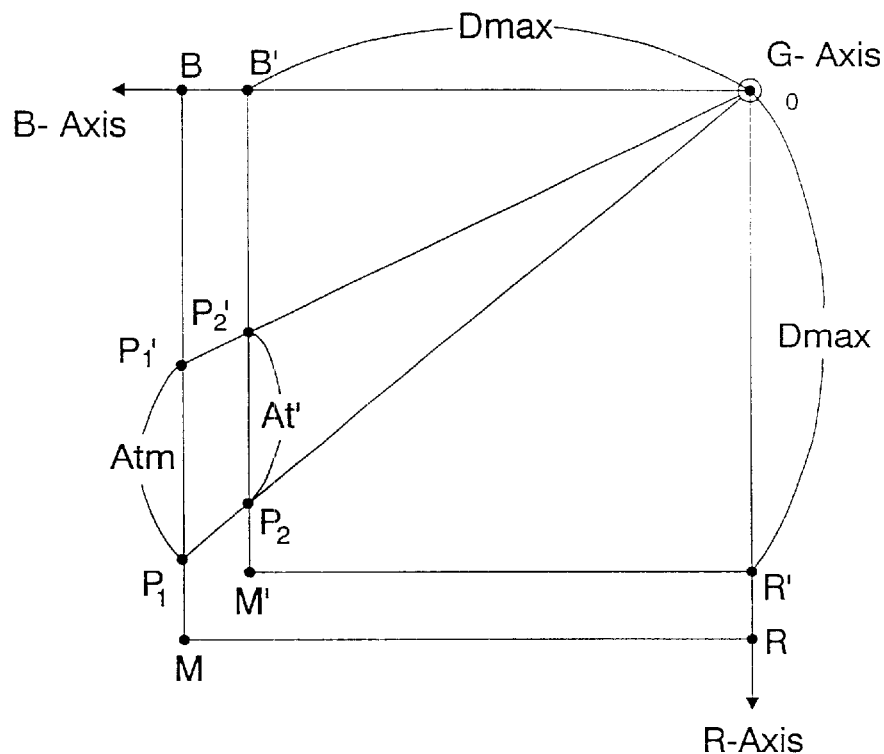
FIG. 2(a) is a top view of the cube shown in FIG. 1 when viewed from the +∞ side of the axis G and FIG. 2(b) is a top view of the cube shown in FIG. 1 when viewed from the +∞ side of the axis B.

FIG. 2(a) is a top view of the cube RYGOBMWC in FIG. 1 viewed from the +∞ side of the axis G. In this case, relation between $|P_1P_1'|$=Atm and $|P_2P_2'|$=At' is shown by the following expression (1).

$$At'=Atm \cdot (Dmax/L) \qquad (1)$$

Figure 2B:
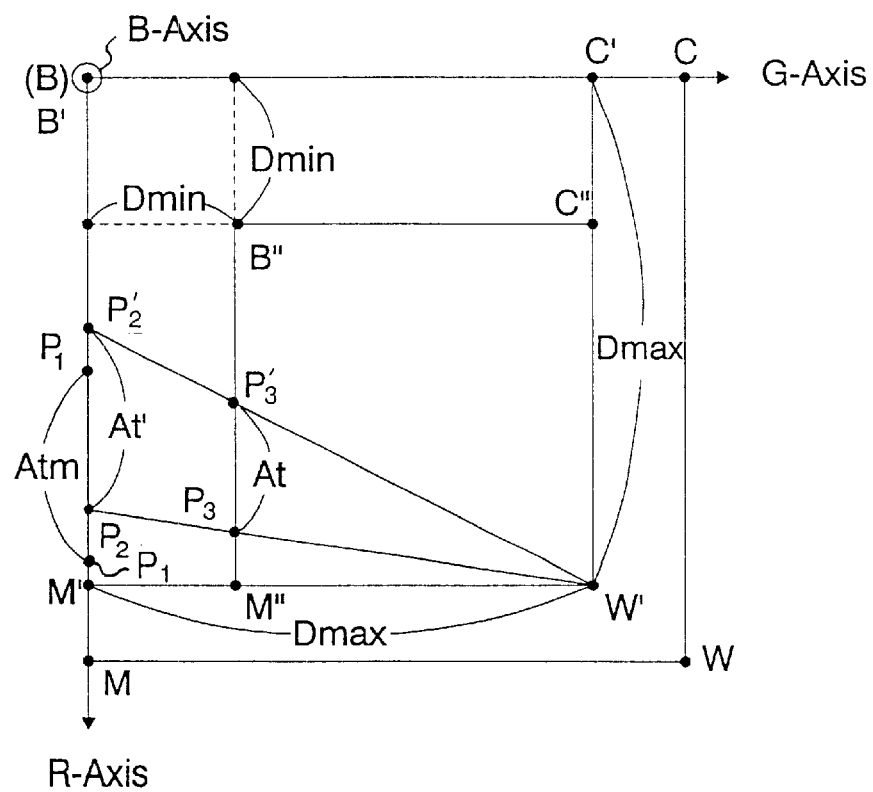

FIG. 2(b) is a top view of the cube RYGOBMWC in FIG. 1 viewed from the +∞ side of the axis B. In this case, the relation between $|P_2P_2'|$=At' and $|P_3P_3'|$=At is shown by the following expression (2).

$$At=At \cdot \{(Dmax-Dmin)/Dmax\} \qquad (2)$$

Thus, the following expression (3) is obtained from the expressions (1) and (2).

$$At=Atm \cdot \{(Dmax-Dmin)/L\}=f(Dmax-Dmin, Atm) \qquad (3)$$

Figure 3:
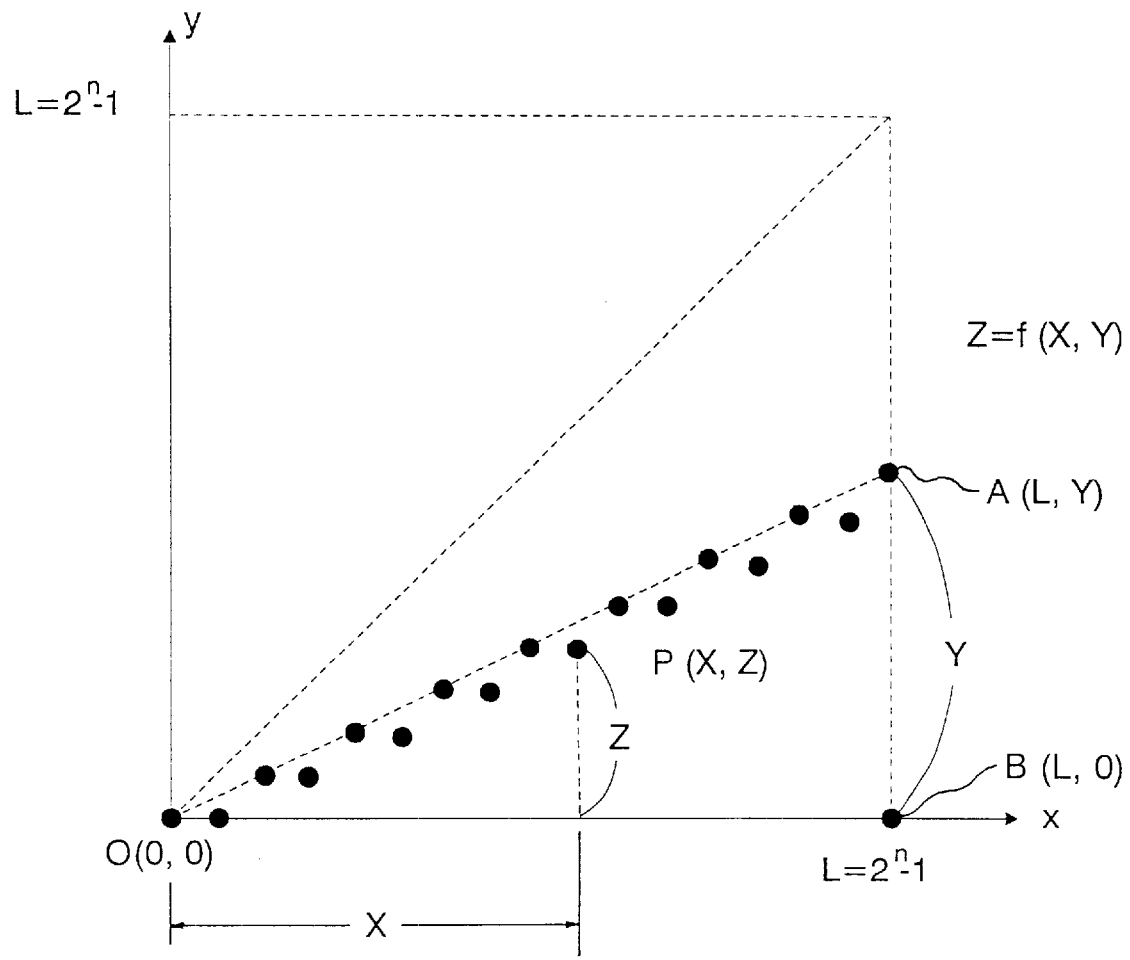
FIG. 3 is an illustration for explaining the concept of a core calculation function.

In this case, when assuming the triangle OAB shown in FIG. 3, Z=f(X, Y) is a function for obtaining a y-coordinate value Z of a point P with an x-coordinate value X among the integral lattice points located nearby the side OA, which is hereafter referred to as core calculation function. The core calculation function is described below in detail.

Then, cases are described in which the above point X is obtained through clockwise transform (that is, R→Y→G) when viewed from the point O (case A) and counterclockwise transform (that is, R←Y←G) when viewed from the point O (case B).

Case A: Clockwise Transform When Viewed From Point O (A-1) When Point X is Present on Line Segment M"R" in FIG. 1:
In this case, the following expression is obtained.

$$Dmax=Rdi \geq Bdi \geq Gdi=Dmin$$

Then, coordinate values of X' can be classified depending on whether the point X' is still present on the line segment M"R" or comes onto R"Y" after movement of the distance At.

(A-1-1) When X' is Present on M"R" After Transform:
In this case, the following expression is obtained.

$$Bdi-Dmin \geq At$$

When assuming Gdi=Dmin, this condition can be replaced with Gdi≦Bdi–At.

In this case, coordinates X' (Rdo, Gdo, Bdo) after transform are shown by the following expressions (4).

$$Rdo=Rdi(=Dmax)$$

$$Gdo=Gdi(=Dmin) \qquad (4)$$

$$Bdo=Bdi-At$$

(A-1-2) When X' Comes Onto R"Y" After Transform:
In this case, the following expression is obtained.

$$Bdi-Dmin \leq At$$

When assuming Gdi=Dmin, this condition can be replaced with Gdi≧Bdi–At.

In this case, coordinates X' (Rdo, Gdo, Bdo) after transform are shown by the following expressions (5).

$$Rdo=Rdi(=Dmax)$$

$$Gdo=Dmin+\{At-(Bdi-Dmin)\}=2 \cdot Gdi-(Bdi-At) \qquad (5)$$

$$Bdo=Gdi(=Dmin)$$

(A-2) When Point X is Present on Line Segment R"Y" in FIG. 1:
In this case, the following expression is obtained.

$$Dmax=Rdi \geq Gdi \geq Bdi=Dmin$$

Moreover, coordinate values of X' can be classified depending on whether the point X' is still present on the line segment R"Y" or comes onto the line segment Y"G" after movement of the distance At.

(A-2-1) When X' is Still Present on R"Y" After Transform:
In this case, the following expression is obtained.

$$Dmax-Gdi \geq At$$

When assuming Rdi=Dmax; this condition can be replaced with Rdi≧Gdi+At.

In this case, coordinates X' (Rdo, Gdo, Bdo) after transform are shown by the following expressions (6).

$$Rdo=Rdi(=Dmax$$

$$Gdo=Gdi+At \qquad (6)$$

$$Bdo=Bdi(=Dmin)$$

(A-2-2) When X' Comes Onto Y"G" After Transform:
In this case, the following expression is obtained.

$$D\max - Gdi \leq At$$

When assuming Rdi=Dmax, this condition can be replaced with $Rdi \leq Gdi + At$.

In this case, coordinates X' (Rdo, Gdo, Bdo) after transform are shown by the following expressions (7).

$$Rdo = D\max - \{At - (D\max - Gdi)\} = 2 \cdot Rdi - (Gdi + At)$$

$$Gdo = Rdi (= D\max) \quad (7)$$

$$Bdo = Bdi (= D\min)$$

(A-3) When Point X is Present on Another Line Segment:

When the point X is present on the line segment Y"G" or G"C", X' can be shown by performing the following replacement in the above expressions (4) to (7).

$$Rdi \rightarrow Gdi, Gdi \rightarrow Bdi, Bdi \rightarrow Rdi$$

$$Rdo \rightarrow Gdo, Gdo \rightarrow Bdo, Bdo \rightarrow Rdo$$

Moreover, when the point X is present on the line segment C"B" or B"M", X' can be shown by performing the following replacement in the above expressions (4) to (7).

$$Rdi \rightarrow Bdi, Gdi \rightarrow Rdi, Bdi \rightarrow Gdi$$

$$Rdo \rightarrow Bdo, Gdo \rightarrow Rdo, Bdo \rightarrow Gdo$$

Case B: Counterclockwise transform when viewed from point O (B-1) When Point X is Present on Line Segment M"R" in FIG. 1:
In this case, the following expression is obtained.

$$D\max = Rdi \geq Bdi \geq Gdi = D\min$$

Then, coordinate values of X' can be classified depending on whether the point X' is still present on the line segment M"R" or comes onto the line segment B"M" after movement of the distance At.

(B-1-1) When X' is Present on M"R" After Transform:
In this case, the following expression is obtained.

$$D\max - Bdi \geq At$$

When assuming Rdi=Dmax, this condition can be replaced with $Rdi \geq Bdi + At$.

In this case, the coordinates X' (Rdo, Gdo, Bdo) after transform are shown by the following expressions (8).

$$Rdo = Rdi (= D\max)$$

$$Gdo = Gdi (= D\min) \quad (8)$$

$$Bdo = Bdi + At$$

(B-1-2) When X' Comes Onto B"M" After Transform:
In this case, the following expression is obtained.

ti $D\max - Bdi \leq At$

When assuming Rdi=Dmax, this condition can be replaced with $Rdi \leq Bdi + At$.

In this case, coordinates X' (Rdo, Gdo, Bdo) after transform are shown by the following expressions (9).

$$Rdo = D\max - \{At - (D\max - Bdi)\} = 2 \cdot Rdi - (Bdi + At)$$

$$Gdo = Gdi (= D\min) \quad (9)$$

$$Bdo = Rdi (= D\max)$$

(B-2) When Point X is Present on Line Segment R"Y" in FIG. 1:
In this case, the following expression is obtained.

$$D\max = Rdi \geq Gdi \geq Bdi = D\min$$

Then, coordinate values of X' can be classified depending on whether the point X' is still present the line segment R"Y" or comes onto the line segment M"R" after movement of the distance At.

(B-2-1) When X' is Present on R"Y" After Transform:
In this case, the following expression is obtained.

$$Gdi - D\min \geq At$$

When assuming Bdi=Dmin, this condition can be replaced with $Bdi \leq Gdi - At$.

In this case, the coordinates X' (Rdo, Gdo, Bdo) after transform are shown by the following expressions (10).

$$Rdo = Rdi (= D\max)$$

$$Gdo = Gdi - At \quad (10)$$

$$Bdo = Bdi (= D\min)$$

(B-2-2) When X' Comes Onto M"R" After Transform:
In this case, the following expression is obtained.

$$Gdi - D\min \leq At$$

When assuming Bdi=Dmin, this condition can be replaced with $Bdi \geq Gdi - At$.

In this case, the coordinates X' (Rdo, Gdo, Bdo) after transform are shown by the following expressions (11).

$$Rdo = Rdi (= D\max)$$

$$Gdo = Bdi (= D\min) \quad (11)$$

$$Bdo = D\min + \{At - (Gdi - D\min)\} = 2 \cdot Bdi - (Gdi - At)$$

(B-3) When Point X is Present on Another Line Segment:

When the point X is present on the line segment Y"G" or GC"C", X' can be shown by performing the following replacement in the above expressions (8) to (11).

$$Rdi \rightarrow Gdi, Gdi \rightarrow Bdi, Bdi \rightarrow Rdi$$

$$Rdo \rightarrow Gdo, Gdo \rightarrow Bdo, Bdo \rightarrow Rdo$$

Moreover, when the point X is present on the line segment C"B" or B"M", X' can be shown by performing the following replacement in the above expressions (8) to (11).

$$Rdi \rightarrow Bdi, Gdi \rightarrow Rdi, Bdi \rightarrow Gdi$$

$$Rdo \rightarrow Bdo, Gdo \rightarrow Rdo, Bdo \rightarrow Gdo$$

Figure 4:
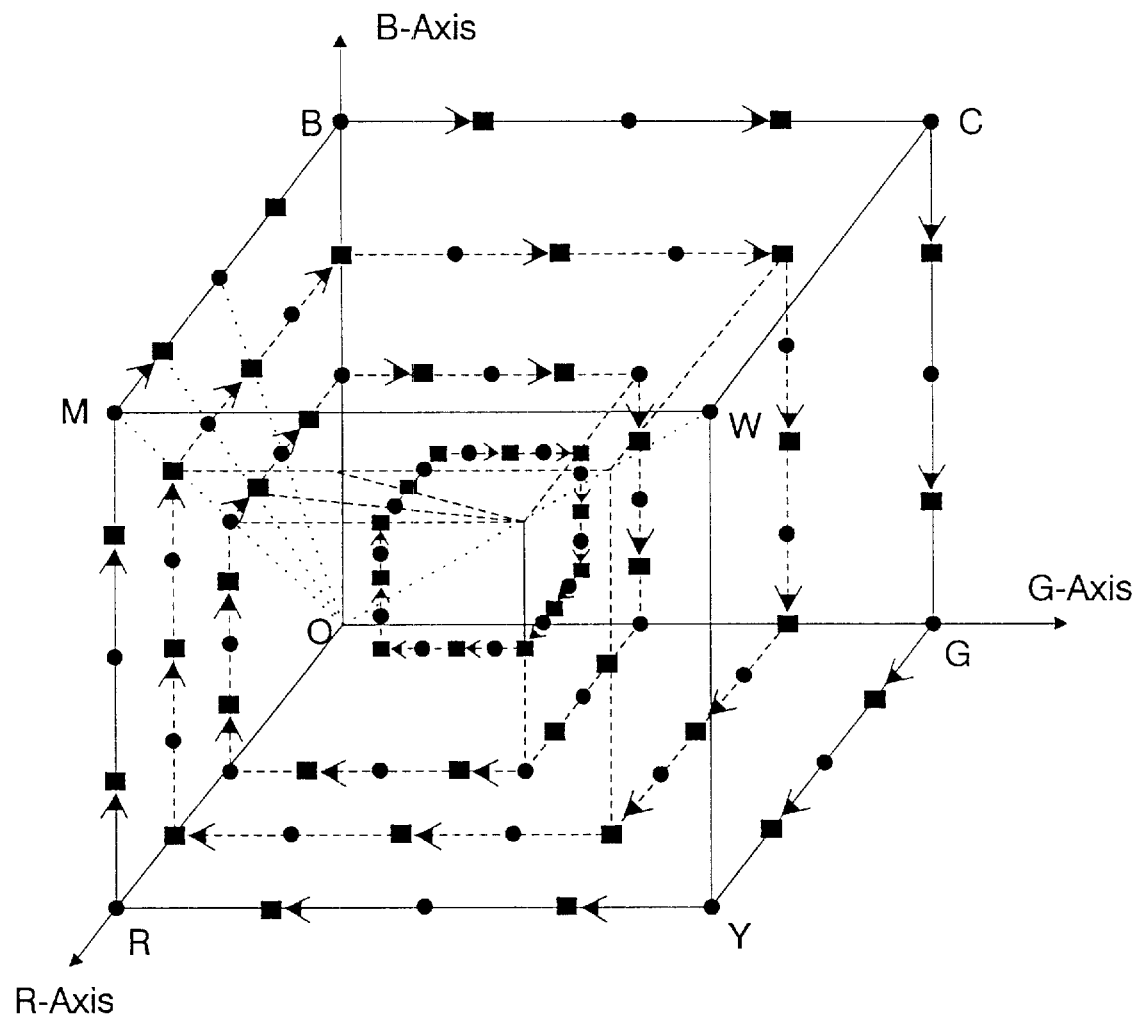
FIG. 4 is an illustration showing how points showing colors in a R-G-B orthogonal coordinate system are transformed in accordance with certain input parameters.

FIG. 4 is an illustration showing how colors in a R-G-B orthogonal coordinate'system are transformed in accordance with some parameters (rotational direction and transformation value) by a transform method of the present invention according to the above description. In the case of the example in FIG. 4, rotation is counterclockwise when viewed from the point O. In FIG. 4, Black Circle symbol at the root of the arrow → shows a color before transform and Black Rectangle symbol at the front end of the arrow → shows a color after transform.

Then, as for the above method of the present invention for controlling a tint in a digital color display system, a core calculation function $f(X,Y)$ used to obtain At from Atm is described below. The core calculation function must be defined as a circuit block having a clock input when it is used to control a tint like the case of the present invention. That's, the block of a core calculation function is a circuit block for obtaining an output Z synchronizing with CLK from inputs X and Y synchronizing with CLK and meets all of the following conditions.

i) For arbitrary Y $f(0,Y)=0$ and $f(L,Y)=Y$ ii) For arbitrary inequality $0 \leq X \leq L$ and arbitrary Y $f(X+1, Y)=f(X, Y)+0$ or $f(X+1, Y)=f(X, Y)+1$ iii) For arbitrary inequality $0 \leq Y \leq L$ and arbitrary X $f(X, Y+1)=f(X, Y)+0$ or $f(X, Y+1)=f(X, Y)+1$ iv) An output Z is always obtained for arbitrary inputs X and Y after a certain clock cycles according to CLK (that is, Z is outputted for inputs X and Y in a pipeline manner).

Where $0 \leq X \leq L$, $0 \leq Y \leq L$, X, Y: Integer $L=2^n-1, n \geq 1$, n: Integer The following expressions are easily obtained from the above Items (i), (ii), and (iii).

For arbitrary X $f(X, 0)=0$ $f(X, L)=X$

That is, from a graphic sense, point $P(X, Z)$ forms one of simple-increase integral lattice points ranging from point O to point A in FIG. 3. and the difference between y-coordinate values of the point P and the rightward adjacent point is 1 at most. Moreover, in case of the increase of Y by+1, the y-coordinate value of each point increases also by 1 at most. Details of the core calculation function have been described by the applicant in another application.

Then, tint-control algorithms of the present invention are summarized below.

Transform for Tint Control

X(Rdi, Gdi, Bdi)→X' (Rdo, Gdo, Bdo)

Input Parameters for Transform

Atm: Distance for moving the point X through the transform when $max(Rdi, Gdi, Bdi)=L(=2^n-1)$ $DIR_{13}$ CW:

=H . . . Moves point X clockwise when viewed from point O about axis OW.

=L . . . Moves point X counterclockwise when viewed from point O about axis OW.

Under the above conditions, transform algorithms for the tint control of the present invention are summarized below.

Transform Algorithms

START

STEP 1

If $Rdi \geq Gdi \geq Bdi$ or $Rdi<Gdi<Bdi$

Then $C_1$=Rdi $C_2$=Gdi $C_3$=Bdi

End If

If $Gdi \geq Bdi \geq Rdi$ or $Gdi<Bdi<Rdi$

Then $C_1$=Gdi $C_2$=Bdi $C_3$=Rdi

End If

If $Bdi \geq Rdi \geq Gdi$ or $Bdi<Rdi<Gdi$ then $C_1$=Bdi $C_2$=Rdi $C_3$=Gdi

End If

STEP 2

Dmax=max $(C_1, C_2, C_3)$

Dmin=min $(C_1, C_2, C_3)$

STEP 3

At=f(Dmax−Dmin, Atm)

Where $Z=f(X, Y)$: core calculation function

STEP 4

$Q=C_2+At$ $P=C_2-At$

STEP 5

If $DIR_{13}$ RW='H' Then

If $C_3>C_2>C_1$ Then

If $C_1 \leq P$ Then $C_1'=C_1$ $C_2'=P$ $C_3=C_3$

Else If $C_1>P$ Then $C_1'=2 \cdot C_1-P$ $C_2'=C_1$ $C_3=C_3$

End if

Else If $C_3 \leq C_2 \leq C_1$ Then

If $C_1 \geq Q$ Then $C_3'=C_1$ $C_2'=Q$ $C_3'=C_3$

Else If $C_1<Q$ Then $C_1'=2 \cdot C_1-Q$ $C_2'=C_1$ $C_3'=C_3$

End If

End If

Else If DIR__CW='L' Then

If $C_3>C_2>C_1$ Then

If $C_3 \geq Q$ Then $C_1'=C_1$ $C_2'=Q$ $C_3'=C_3$

Else If $C_3 \leq Q$ Then $C_1'=C_1$

```
            C₂'=C₃
            C₃'=2·C₃-Q
        End If
    Else If C₃≦C₂≦C₁ Then
        If C₃>P Then
            C₁'=C₁
            C₂'=P
            C₃'=C₃
        Else If C₃>P Then
            C₁'=C₁
            C₂'=C₃
            C₃'=2·C₃-P
        End If
    End If
STEP 6
    If
        Rdi≧Gdi≧Bdi or Rdi<Gdi<Bdi
    Then
        Rdo=C₁'
        Gdo=C₂'
        Bdo=C₃'
    End If
    If
        Gdi≧Bdi≧Rdi or Gdi<Bdi<Rdi
    Then
        Gdo=C₁'
        Bdo=C₂'
        Rdo=C₃'
    End If
    If
        Bdi≧Rdi≧Gdi or Bdi<Rdi<Gdi
    Then
        Bdo=C₁'
        Rdo=C₂'
        Gdo=C₃'
    End If
END
```

Figure 5:
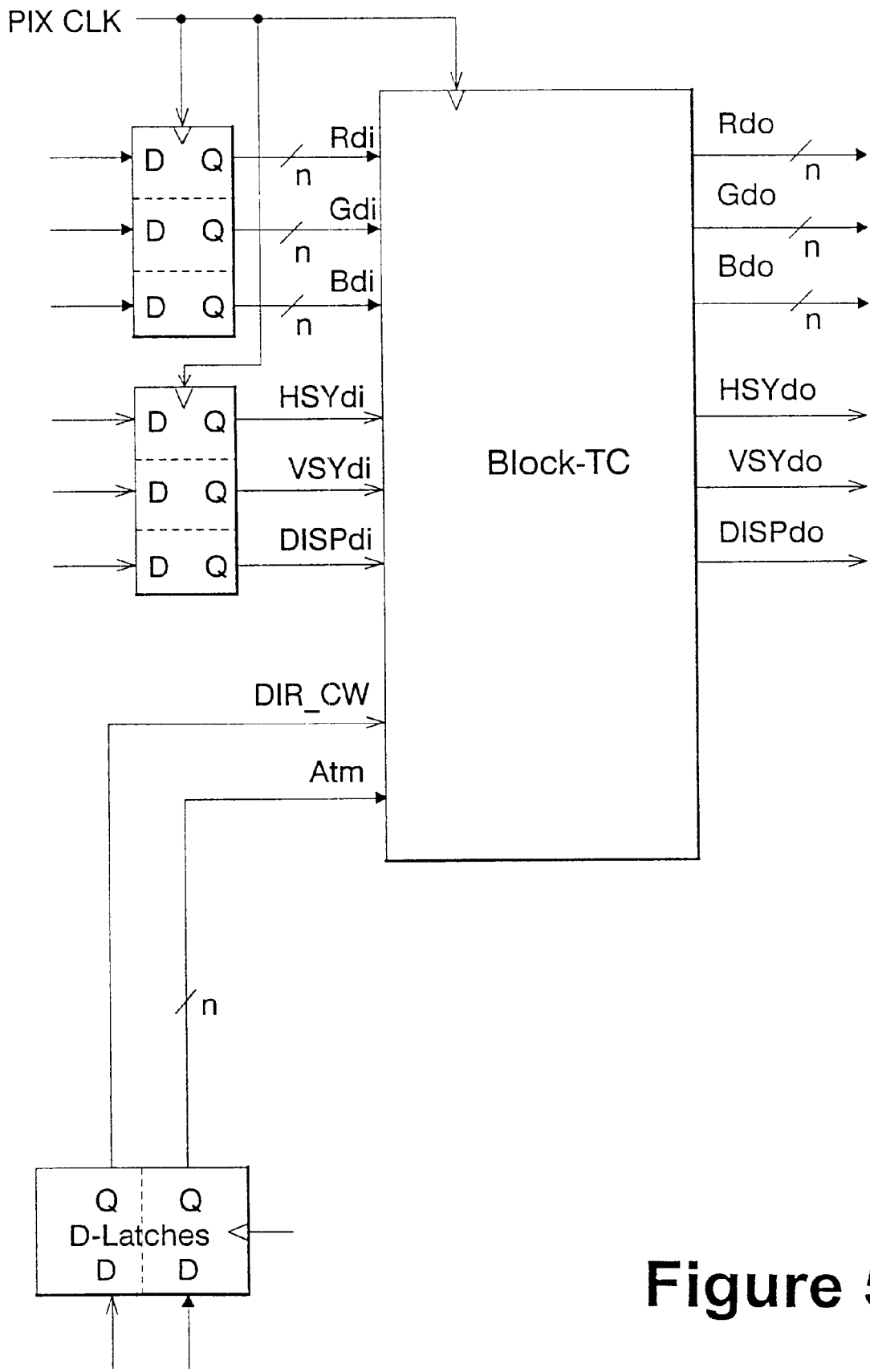
FIG. 5 is an illustration showing a tint control block in a digital color display system.

Then, a circuit for realizing the above method of the present invention for controlling a tint in a digital color display system is described below. FIG. 5 is an illustration showing a digital-color-data transform block of the present invention in an n-bit/color digital color display system. In the case of the example shown in FIG. 5, input bus signals Rdi, Gdi, and Bdi for Block-TC respectively transfer color data for red, green, and blue sub-pixels successively sent from a host machine synchronously with a pixel clock (PIX_CLK). Symbols VSYdi, HSYdi, and DISPdi denote synch control signals for horizontal synch, vertical synch, and display timing respectively. Moreover an input bus signal Atm denotes a maximum-moving-distance (rotation value) setting input for tint control and DIR_CW denotes a moving(rotational)-direction setting input. Furthermore, rotation is performed in the direction of red→yellow → green for DIR_CW='H' and in the direction of green→ yellow→ red for DIR_CW='L'. These are all outputs of latches and these latches are set by a user from the outside of the system. Details of the setting method are not described because they are out of the scope of the present invention.

Figure 6:
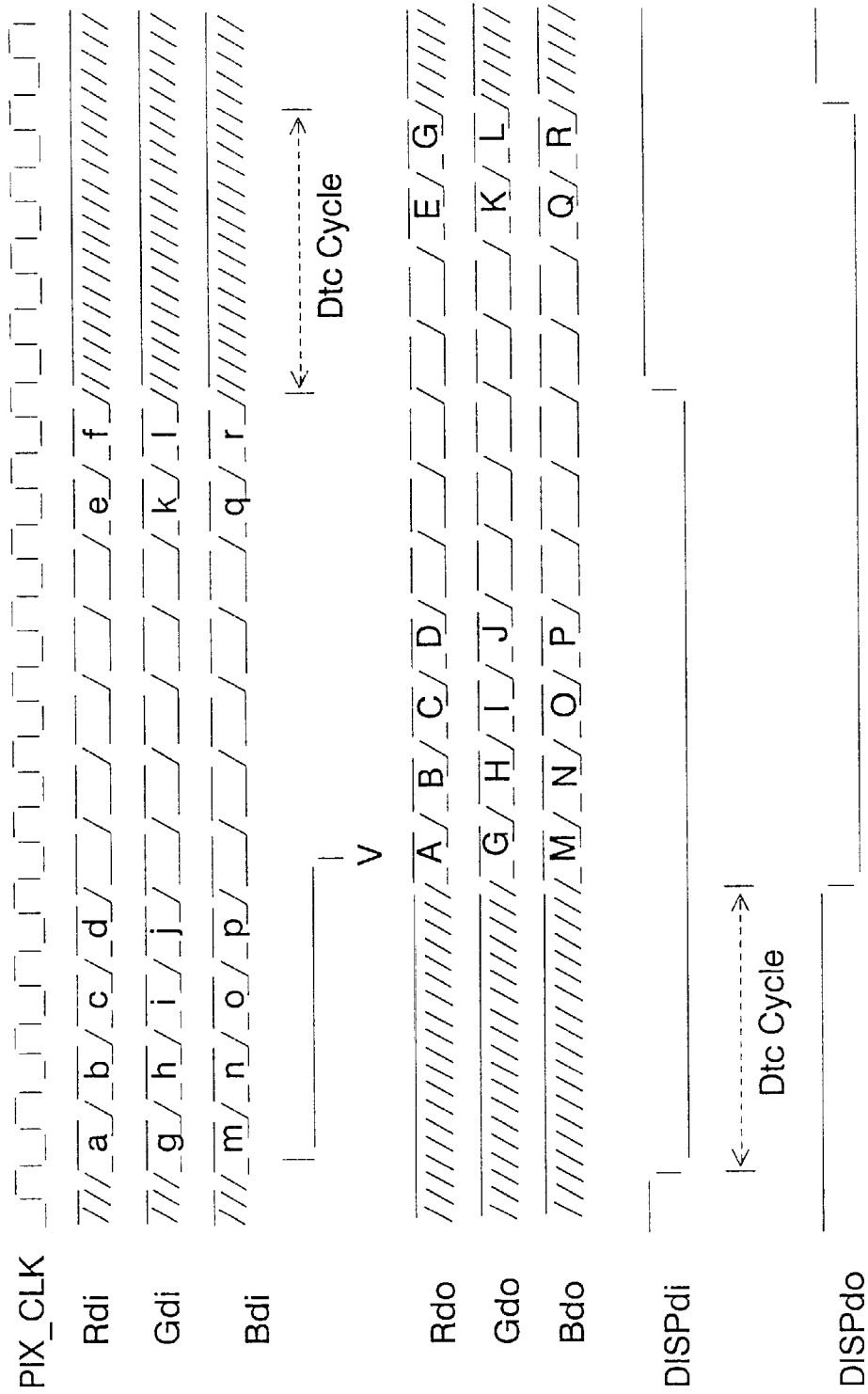
FIG. 6 is an illustration showing a timing chart showing the relation between input and output signals.

Block-TC applies the above transform to values of Rdi, Gdi, and Bdi for each clock phase in order to perform tint control by referring to values of Atm and DIR_CW and also outputs the values as signals Rdo, Gdo, and Bdo synchronizing with pixel clocks in a pipeline manner after a delay equivalent to Dtc clock cycles. Moreover, VSYdi, HSYdi, and DISPdi are only delayed by Dtc clock cycles and outputted as VSYdo, HSYdo, and DISPdo respectively. FIG. 6 shows a timing chart showing the relation between these input and output signals.

Figure 7:
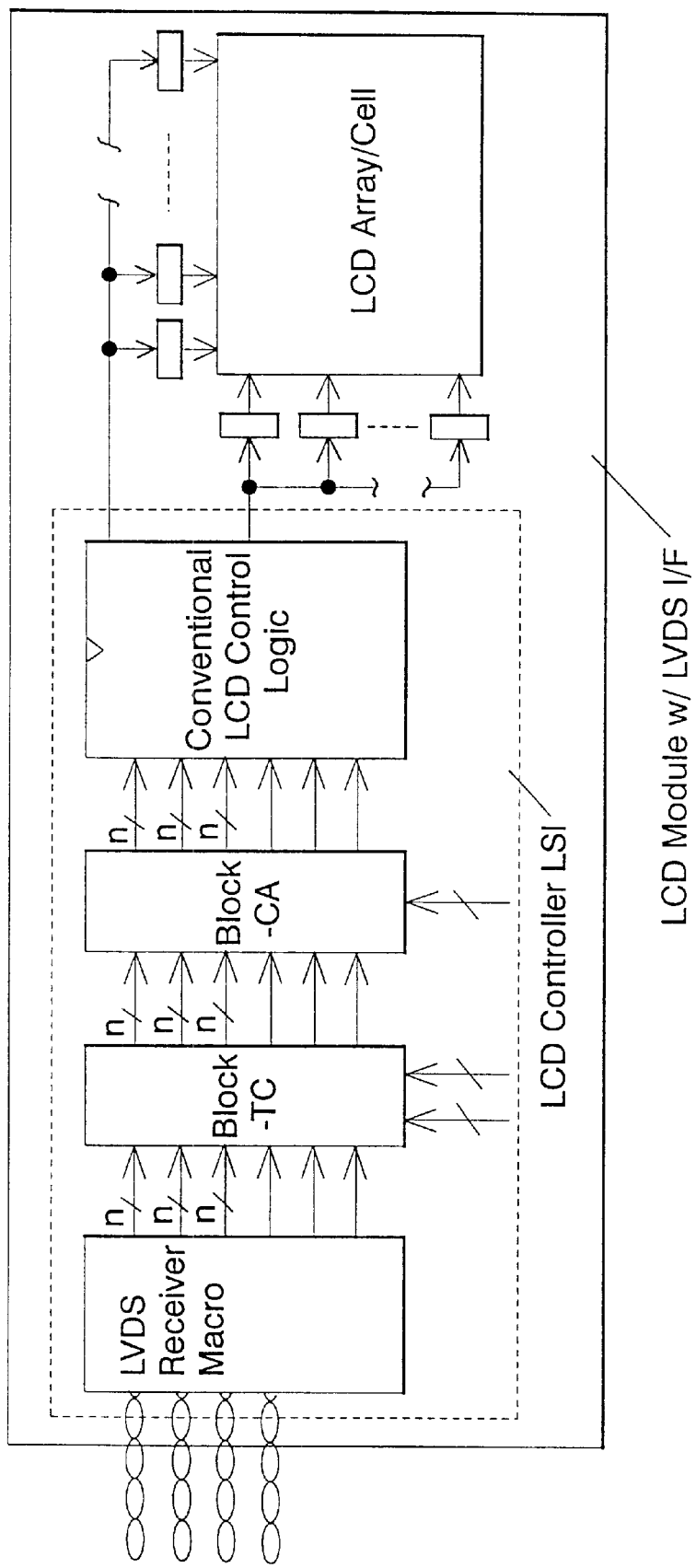
FIG. 7 is an illustration showing an LCD module having an LVDS video interface.

For example, when assuming an LCD module of the LVDS video interface as a digital color display system, Block-TC is located between LVDS receiver macro and other color control block such as white point control or the like in an LCD controller LSI as shown in FIG. 7.

Figure 8:
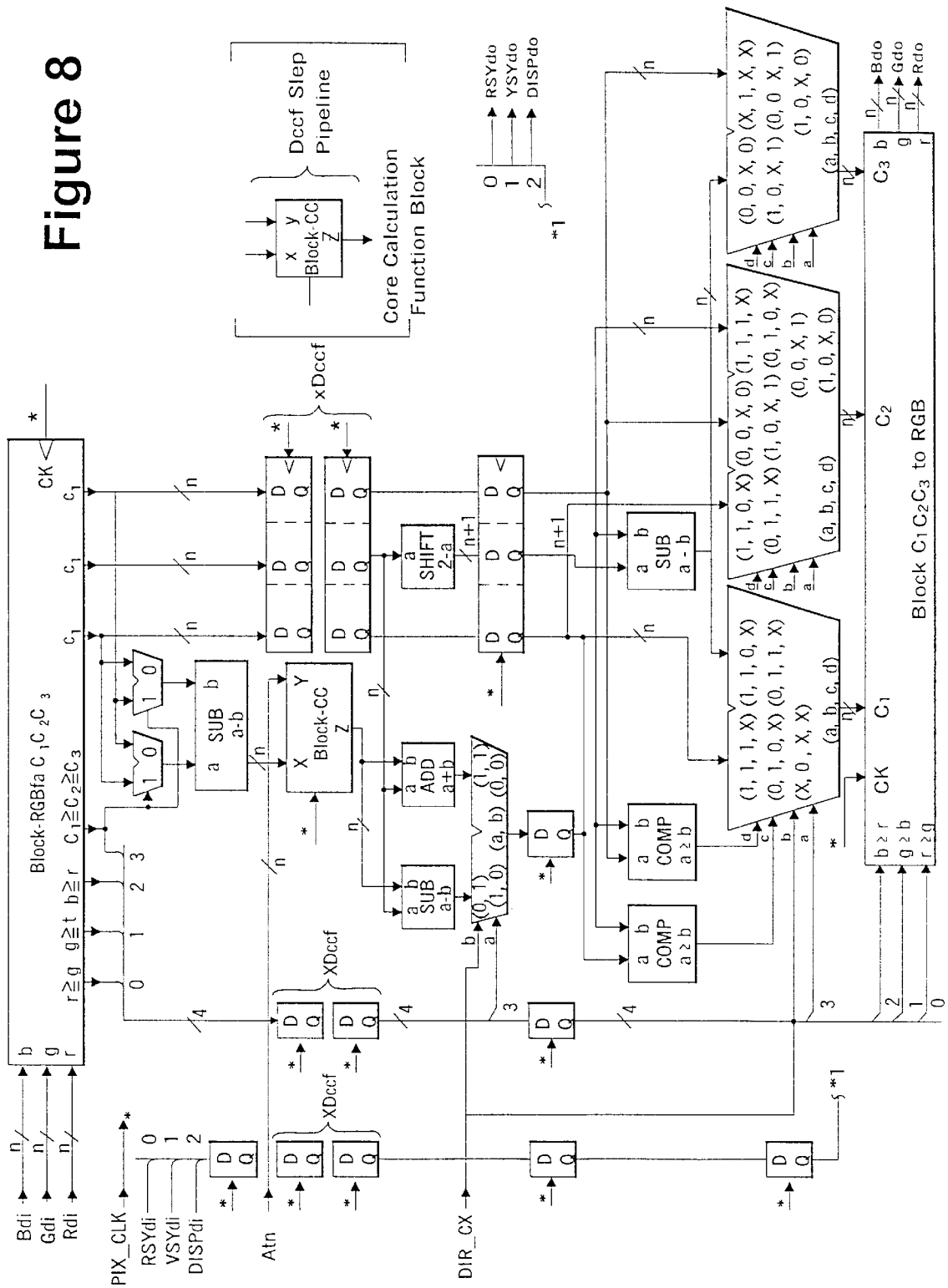
FIG. 8 is an illustration showing a configuration of the Block-TC shown in FIG. 5.
Figure 9:
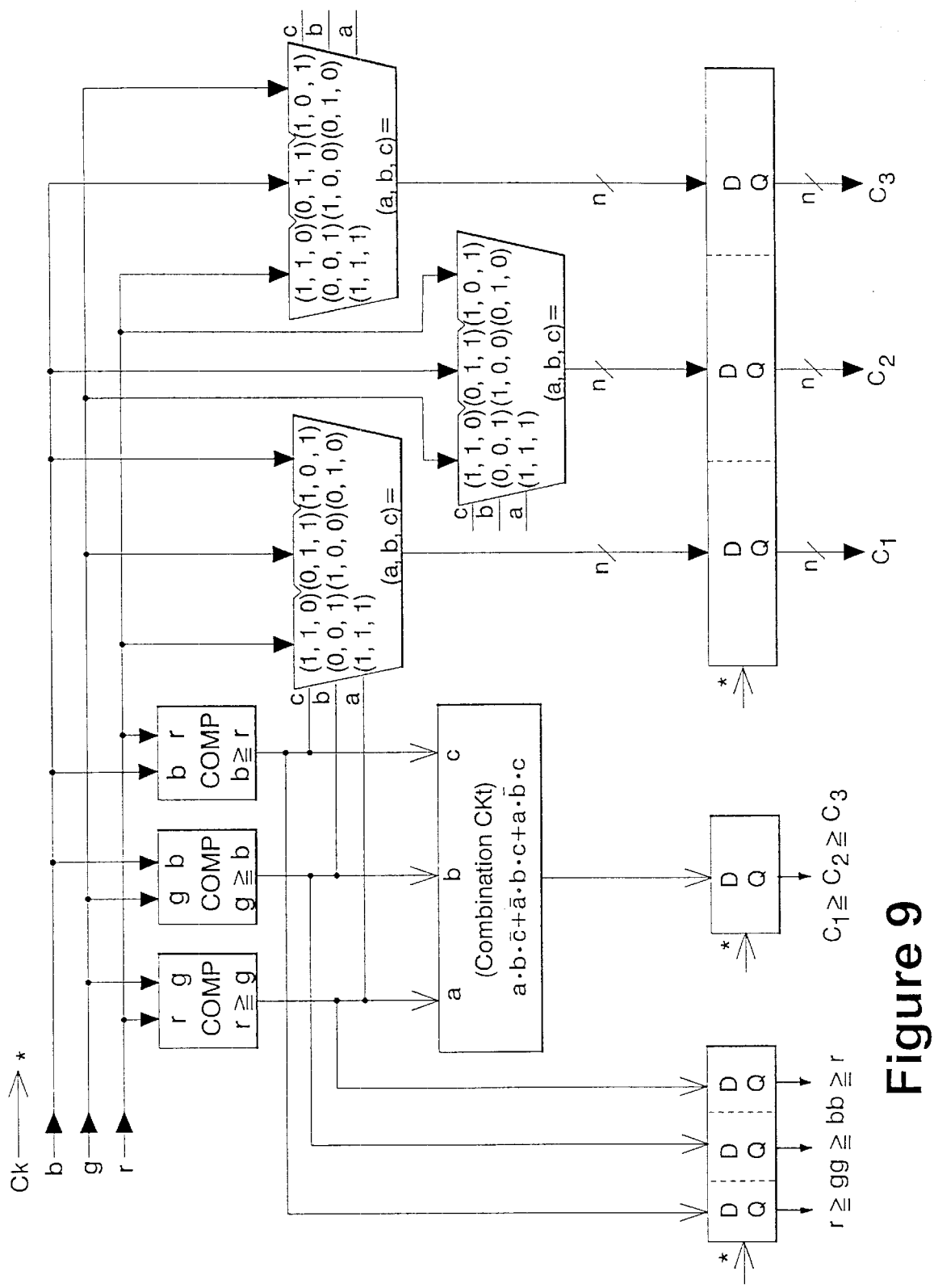
FIG. 9 is an illustration showing a configuration of the Block-RGBtoC$_1$C$_2$C$_3$ shown in FIG. 8.
Figure 10:
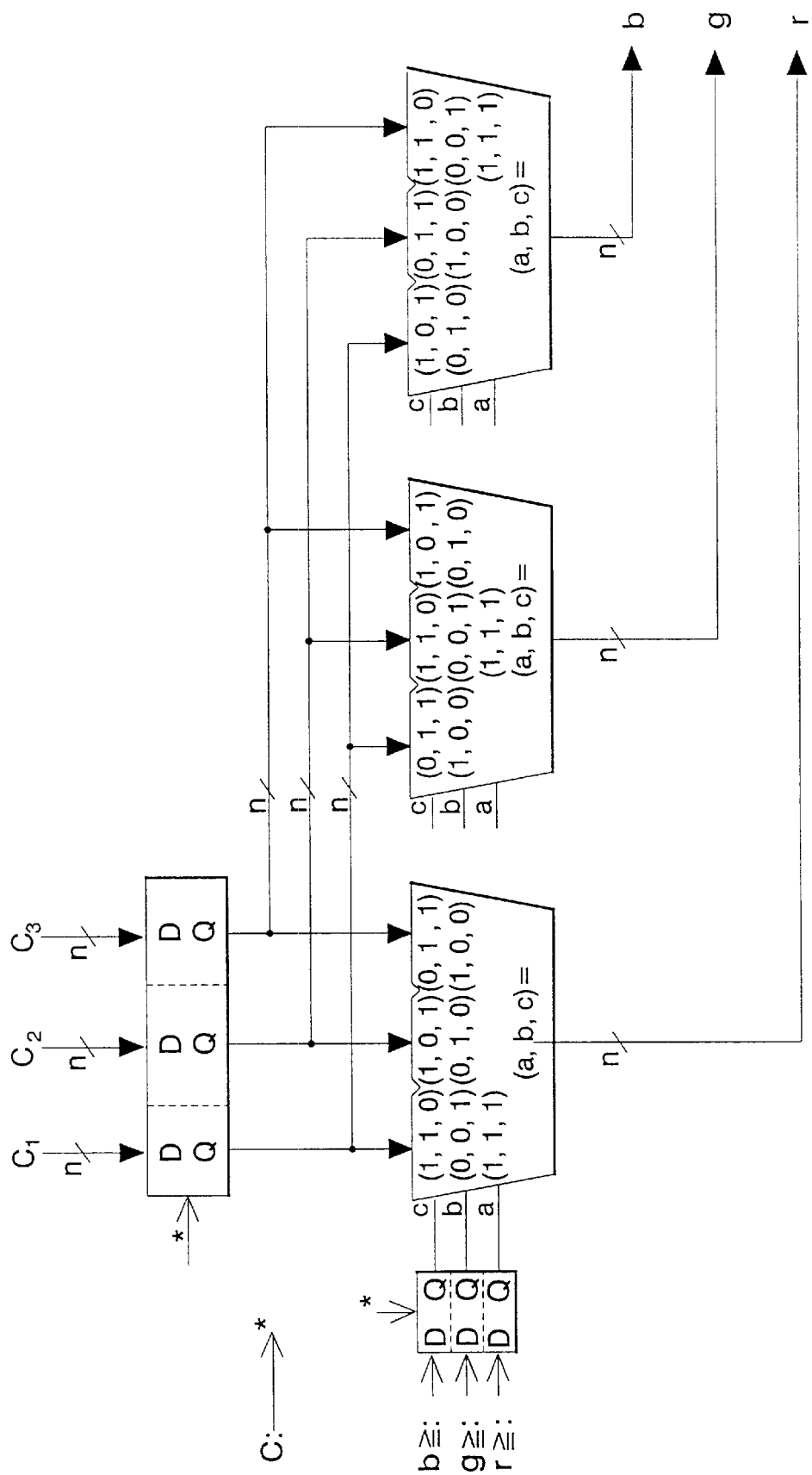
FIG. 10 is an illustration showing a configuration of the Block-C$_1$C$_2$C$_3$toRGB shown in FIG. 8.
Figure 13A:
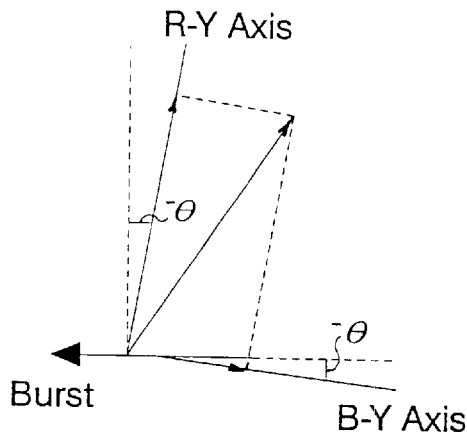
FIG. 13 (a) is an illustration showing a case of slightly delaying a relative phase (by −φ), FIG. 13.(b) is an illustration showing the state of FIG. 13(a) by the vector space shown in FIG. 12.
FIG. 13(c) is an illustration showing a case of slightly advancing a relative phase (by +φ)
FIG. 13(d) is an illustration showing the state of FIG. 13(c) by the vector space shown in FIG. 12.
Figure 13B:
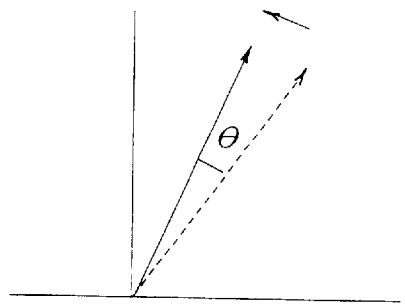
Figure 13C:
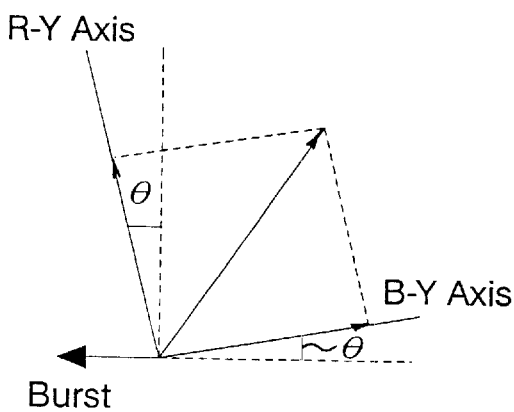
Figure 13D:
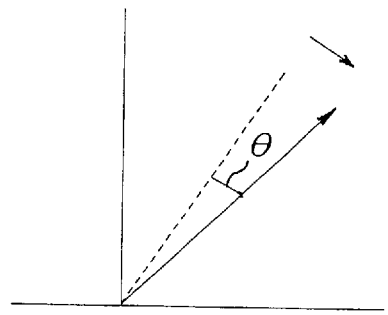
Figure 14:
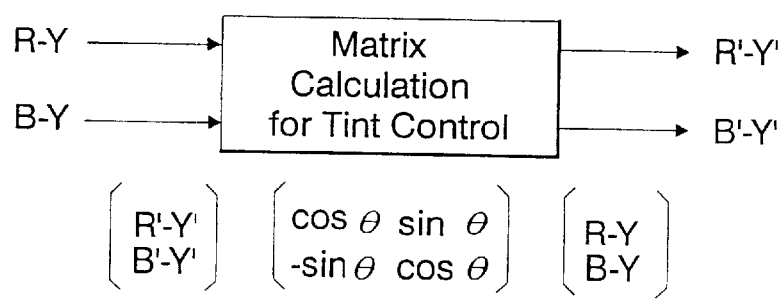
FIG. 14 is an illustration showing a method according to the matrix operation of R-Y and B-Y signals as an example for shifting a relative phase

FIG. 8 shows a block diagram of register transfer level of the whole logic constituting the Block-TC in FIG. 5. Moreover, FIG. 9 shows details of Block-RGBto$C_1C_2C_3$ in FIG. 8 and FIG. 10 shows details of Block-$C_1C_2C_3$toRGB in FIG. 8.

Because the number of stages of the pipeline of the core calculation function block is set to Dccf in FIG. 8, the total number of stages of the pipeline of the entire Block-TC comes to Dccf +3. Another invention describing the core calculation function in detail introduces that the core calculation function block can be constituted by a four-stage pipeline (68 D-latches) in the case of 8-bit/color (that is, n=8). Therefore, when using this, the number of pipeline stages of Block-TC becomes seven. The circuit shown in FIG. 8 is very simple when assuming that the circuit is incorporated into the LCD controller LSI shown in FIG. 7.

As described above, the present invention makes it possible to efficiently perform tint control of colors displayed on a digital-type color display system by a simple circuit by transforming original digital color data inputted from a host system in accordance with several set values supplied from the outside of the system and preferably by using a core calculation function.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by letters patent is:

1. A method of controlling a tint in a digital color display system having a digital video interface for inputting a digital video signal outputted from a host machine said digital color display system transforming the digital video signal inputted from the digital video interface without using a Look Up Table to provide display colors, wherein three primary colors R, G, and B comprise the display colors and each color is expressed by digital data of n bits (n:integer equal to or larger than 1), the method comprising:

a) when the maximum and the minimum values among R, C, B are the maximum gray scale value ($=L=2^n-1$) and the minimum gray scale value ($=0$) respectively, a step of transforming the input color into a color of a different tint having the maximum value among R, G, B equal to the maximum gray scale value ($=L=2^n-1$) and the minimum value among R, G, B equal to the minimum gray scale value ($=0$), based on a user defined maximum transformation value ($=Atm$) and a transformation direction (either from (R, G, B)=(L, 0, 0) via (R, G, B)=(0, L, 0) to (R, G, B)=(0, 0, L) or (R, G, B)=(0, 0, L) via (R, G, B)=(0, L, 0) to (R, G, B)=(L, 0, 0));

b) when the maximum and the minimum values among R, G, B are Dmax and Dmin respectively ($0<Dmin<Dmax<L=2^n-1$), a step of transforming the input color into a color of a different tint having the maximum value among R, G, B equal to Dmax and the minimum value among R, G, B equal to Dmin, based on a transformation value At less than said user defined maximum transformation value Atm and computed therefrom and the transformation direction same as the case of the Atm; and c) when all values of R, G, B are equal, a step of not transforming the input color in accordance with any input set value.

2. The method for controlling a tint in a digital color display system according to claim 1, wherein the transformation value At is computed from the maximum transformation value Atm set by the user in accordance with At=Atm·{(Dmax−Dmin)/L}.

3. The method for controlling a tint in a digital color display system according to claim 1, wherein the transformation value At is computed from the maximum transformation value Atm set by the user in accordance with At=f(Dmax−Dmin, Atm) in which f(X, Y) denotes a core calculation function.

4. The method for controlling a tint in a digital color display system according to claim 1, wherein to compute the transformation value At, when approximating a line segment in an orthogonal two-dimensional coordinate system to a point having integral coordinates, a triangle OAB consisting of the origin O (0,0), a point A (L, Y), and a point B (L,0) is assumed to compute the y-coordinate value Z of a point P whose x-coordinate value is X among points nearby the side OA whose coordinate values are integers (hereafter referred to as "integral lattice point") in accordance with the following core calculation function f(X,Y):

$$Z=f(X,Y)$$

where $0 \leq X \leq L$, $0 \leq Y \leq L$, X, Y: integer $L=2^n-1$, $n \geq 1$, n: integer all of the following conditions must be satisfied;

i) for arbitrary Y, the following expression is effectuated;
   f(0, Y)=0 and f(L, Y)=Y ii) for arbitrary $0 \leq X < L$ and arbitrary Y, the following expression is effectuated;

$$f(X+1, Y)=f(X, Y)+0$$

or $$f(X+1, Y)=f(X, Y)+1$$

iii) for arbitrary $0 \leq Y < L$ and arbitrary X, the following expression is effectuated;

$$f(X, Y+1)=f(X, Y)+0$$

or $$f(X, Y+1)=f(X, Y)+1$$

and iv) for arbitrary input X and Y, an output Z is always obtained after a certain operation step.

5. An apparatus for executing the method for controlling a tint in a digital color display system according to claim 1, constituted so that an output value after transformed is outputted to an input value before transformed in a pipeline manner as a whole, by using the transform of a line segment to integers using the core calculation function Z=f(X, Y) constituted so that Z is outputted for inputs X and Y in a pipeline by hardware as the basis of transform.

* * * * *

UNITED STATES PATENT AND TRADEMARK OFFICE
CERTIFICATE OF CORRECTION

PATENT NO.   : 6,614,488 B1
DATED        : September 2, 2003
INVENTOR(S)  : Kazuchi Yamauchi et al.

It is certified that error appears in the above-identified patent and that said Letters Patent is hereby corrected as shown below:

Title page,
Item [75], Inventors, "Yamato" should read -- Yamato-shi -- and "Zama" should read -- Zama-shi --

Column 4,
Line 59, after "phase" insert -- . --

Column 5,
Line 23, "point x" should read -- point X --
Line 33, "$0 \leqq Atm \leqq L$" should read -- $0 \leq Atm \leq L$ --

Column 6,
Lines 4-6, "Transform When Viewed From Point O When Point X is Present on Line Segment" should read -- transform when viewed from point O When point X is present on line segment --
Line 15, "When X' is Present on M"R" After Transform" should read -- when X' is present on M"R" after transform --
Line 30, "When X' Comes Onto R"Y" After Transform" should read -- when X' comes onto R"Y" after transform --
Line 44, "When Point X is Present on Line Segment R"Y" in" should read -- when point X is present on line segment R"Y" in --
Line 54, "When X' is Still Present on R"Y" After Transform" should read -- when X' is still present on R"Y" after transform --
Line 59, "Dmax;" should read -- Dmax, --

Column 7,
Line 1, "When X' Comes Onto Y"G" After Transform" should read -- when X' comes onto Y"G" after transform --
Line 16, "When Point X is Present on Another Line Segment" should read -- when point X is present on another line segment --
Line 34, "When Point X is Present on Line Segment M"R" in" should read -- when point X is present on line segment M"R" in --
Line 44, "When X' is Present on M"R" After Transform" should read -- when X' is present on M"R" after transform --
Line 59, "When X' Comes Onto B"M" After Transform" should read -- when X' comes onto B"M" after transform --

UNITED STATES PATENT AND TRADEMARK OFFICE
CERTIFICATE OF CORRECTION

PATENT NO. : 6,614,488 B1
DATED : September 2, 2003
INVENTOR(S) : Kazuchi Yamauchi et al.

It is certified that error appears in the above-identified patent and that said Letters Patent is hereby corrected as shown below:

Column 8,
Line 6, "When Point X is Present on Line Segment R"Y" " should read -- when point X is present on line segment R"Y" --
Line 16, "When X' is Present on R"Y" After Transform" should read -- when X' is Present on R"Y" After Transform" should read -- when X' is present on R"Y" after transform --
Line 30, "When X' Comes Onto M"R" After Transform" should read -- when X' comes onto M"R" after transform --
Line 45, "When Point X is Present on Another Line Segment" should read -- when point X is present on another line segment --
Line 47, "GC"C" " should read -- G"C" --
Line 61, "coordinate' " should read -- coordinate --

Column 9,
Line 60, "$DIR_{13}$ CW" should read -- DIR_CW --

Column 12,
Line 52, "C, B" should read -- G, B --,

Signed and Sealed this

Twenty-eighth Day of December, 2004

JON W. DUDAS
*Director of the United States Patent and Trademark Office*